US012746102B2

(12) United States Patent
Lim et al.

(10) Patent No.: US 12,746,102 B2
(45) Date of Patent: Sep. 29, 2026

(54) DENTAL BULK BLOCK FOR CAD/CAM MACHINING PROCESS AND MANUFACTURING METHOD OF THE SAME

(71) Applicant: HASS CO., LTD., Gangwon-do (KR)

(72) Inventors: Hyung Bong Lim, Gyeonggi-do (KR); Yong Su Kim, Gangwon-do (KR)

(73) Assignee: HASS CO., LTD., Gangneung-si (KR)

( * ) Notice: Subject to any disclaimer, the term of this patent is extended or adjusted under 35 U.S.C. 154(b) by 1154 days.

(21) Appl. No.: 17/658,112

(22) Filed: Apr. 6, 2022

(65) Prior Publication Data

US 2022/0378561 A1 Dec. 1, 2022

Related U.S. Application Data

(63) Continuation of application No. PCT/KR2021/006673, filed on May 28, 2021.

(51) Int. Cl.

*A61C 13/00* (2006.01)
*A61C 5/73* (2017.01)

(Continued)

(52) U.S. Cl.

CPC ............ *A61C 13/0022* (2013.01); *A61C 5/73* (2017.02); *A61C 5/77* (2017.02); *A61C 8/0012* (2013.01);

(Continued)

(58) Field of Classification Search

None

See application file for complete search history.

(56) References Cited

U.S. PATENT DOCUMENTS 9,700,392 B2 7/2017 Hoshino et al.
9,701,573 B2 7/2017 Beall et al.

(Continued)

FOREIGN PATENT DOCUMENTS

CN 106365456 A * 2/2017 ............. A61K 6/836
EP 2 788 297 B1 11/2019

(Continued)

OTHER PUBLICATIONS

Machine translation of CN106365456A via EPO, translated Apr. 9, 2025 (Year: 2017).*

(Continued)

*Primary Examiner* — Elizabeth Collister

(74) *Attorney, Agent, or Firm* — NKL LAW; Jae Youn Kim

(57) ABSTRACT

A dental bulk block for a CAD/CAM machining process. The dental bulk block is a glass-ceramic block having a crystalline phase embedded in an amorphous glass matrix. The crystalline phase includes lithium disilicate as a main crystalline phase, no sub-crystalline phase exists, and the crystalline phase has a mean grain size of 0.01 to 1.0 μm and a crystallinity degree of 25 to 45%. The dental bulk block can improve machinability during cutting such as CAD/CAM machining in the state of a high-strength workpiece with high flexural strength, thereby reducing a tool resistance and a wear rate, increasing a tool life span, and reducing edge chipping during a machining process. In addition, a dental restoration with desired translucency variations can be manufactured through a simple process of machining a block and altering post-heat treatment conditions, and thus can be realized with various shades.

8 Claims, 5 Drawing Sheets

(51) Int. Cl.

| | |
|---|---|
| ***A61C 5/77*** | (2017.01) |
| ***A61C 8/00*** | (2006.01) |
| ***C03B 32/02*** | (2006.01) |
| ***C03C 4/00*** | (2006.01) |
| ***C03C 10/00*** | (2006.01) |

(52) U.S. Cl.

CPC ............ *C03B 32/02* (2013.01); *C03C 4/0021* (2013.01); *C03C 10/0027* (2013.01); *C03C 2203/52* (2013.01)

(56) References Cited

U.S. PATENT DOCUMENTS

| | | | |
|---|---|---|---|
| 10,064,708 B2 | 9/2018 | Burke et al. | |
| 10,405,953 B2 | 9/2019 | Hoshino et al. | |
| 11,166,795 B2 | 11/2021 | Hoshino et al. | |
| 2014/0232030 A1* | 8/2014 | Ritzberger ............ | C03C 23/007 264/16 |
| 2015/0274581 A1 | 10/2015 | Beall et al. | |
| 2015/0374465 A1 | 12/2015 | Burke et al. | |
| 2016/0152512 A9 | 6/2016 | Beall et al. | |
| 2016/0287361 A1 | 10/2016 | Hoshino et al. | |
| 2017/0224450 A1 | 8/2017 | Hoshino et al. | |
| 2019/0328495 A1 | 10/2019 | Hoshino et al. | |
| 2020/0069399 A1 | 3/2020 | Ritzberger | |
| 2020/0377403 A1* | 12/2020 | Lim ..................... | A61C 13/082 |

FOREIGN PATENT DOCUMENTS

| | | | |
|---|---|---|---|
| JP | 2018145084 | A | 9/2018 |
| KR | 10-2015-0119256 | A | 10/2015 |
| KR | 10-2016-0048990 | A | 5/2016 |
| KR | 10-2016-0105826 | A | 9/2016 |
| KR | 10-2018-0018929 | A | 2/2018 |
| KR | 10-2018-0102711 | A | 9/2018 |
| KR | 20180134002 | A | 12/2018 |
| KR | 10-2020-00118375 | A | 10/2020 |
| KR | 10-2020-00137198 | A | 12/2020 |

OTHER PUBLICATIONS

International Search Report for corresponding International Application No. PCT/KR2021/006673 mailed Feb. 25, 2022.

Korean Office Action dated Nov. 28, 2022 for corresponding Korean Application No. KR10-2021-0069233 and English translation.

Zhenzhen Zhang, et al., Effects of crystal refining on wear behaviors and mechanical properties of lithium disilicate glass-ceramics, Journal of the Mechanical Behavior of Biomedical Materials, Nov. 3, 2017, pp. 52-60, Elsevier Ltd.

Yaseen Iqbal, et al., Metastable phase formation in the early stage crystallisation of lithium disilicate glass, Journal of Non-Crystalline Solids 224, May 5, 1997, pp. 1-16, Elsevier Science B.V.

Julia Lubauer, et al., Grasping the Lithium hype: Insights into modern dental Lithium Silicate glass-ceramics, Dental Materials 38, Sep. 7, 2021, pp. 318-332, Elsevier.

European Patent Office, Communication in regard to Patent Application No. 21943172.3-1014 / 4349299 PCT/KR2021006673, Mar. 24, 2025.

* cited by examiner

DENTAL BULK BLOCK FOR CAD/CAM MACHINING PROCESS AND MANUFACTURING METHOD OF THE SAME

CROSS REFERENCE TO RELATED APPLICATION

This is a continuation of International Application No. PCT/KR2021/006673 filed on May 28, 2021. The content of the application is incorporated herein by reference in entirety. The present disclosure is a result of an R&D project supported by the Korea Medical Device Development Fund grant funded by the Korean government (Ministry of Science and ICT) in the project no. RS-2020-KD000288 with the project ID no. 1711138931, titled "Double-blind, randomized assignment comparison clinical study on the clinical efficacy of domestic lithium disilicate ceramic blocks in conservative tooth restoration using CAD/CAM," conducted by HASS CO., LTD, during the fiscal R&D period of May 1, 2021 to Apr. 30, 2022, which is part of the total R&D period of Nov. 1, 2020 to Dec. 31, 2022.

TECHNICAL FIELD

The present disclosure relates to dental bulk blocks for a CAD/CAM machining process and manufacturing methods thereof, the dental bulk blocks being capable of use as a high-strength workpiece while enabling translucency variations.

BACKGROUND

Materials and methods for manufacturing artificial teeth using glass containing a lithium disilicate crystal (monolithic dental crown) are already known through various patents. However, in the known techniques, it is difficult to perform direct machining due to due to a coarse crystalline phase. For machining, it is necessary to primarily form a lithium metasilicate crystalline phase (machinable crystalline), and then secondarily form a high-strength lithium disilicate crystalline phase through a heat treatment. Therefore, dimensional accuracy is lowered due to shrinkage caused by the heat treatment, and it is cumbersome to additionally perform the heat treatment. In general, prosthetic machining by CAD (Computer-Aided Design)-CAM (Computer-Aided Manufacturing) requires the manufacturing of a prosthesis by directly machining a bulk body in a dental clinic, and fitting of the bulk body to a patient as quickly as possible (e.g., in case of one-day turnaround appointments). Therefore, a time delay due to a heat treatment process poses financial difficulties on patients and users.

In addition, a conventional lithium disilicate glass-ceramic material has a limit in having a high light transmittance or opalescence similar to those of natural teeth due to its coarse crystalline phases.

In particular, in order to machine the conventional lithium disilicate glass-ceramic material, a lithium metasilicate glass-ceramic having good machinability is primarily prepared, and then lithium disilicate is prepared through a secondary crystallization heat treatment to improve strength. In this case, the size of a crystalline phase is about equal to or greater than 3 μm. However, in this state, the machinability is remarkably lowered, and only the required strength can be realized.

In an effort to solve these problems, the Applicant has proposed the methods of manufacturing a glass-ceramic including lithium disilicate and silicate crystalline phases with excellent machinability by changing a primary heat treatment temperature so as to control a crystal size, and has received a patent therefor (Korean Patent No. 10-1975548). Specifically, there has been disclosed the method of manufacturing a glass-ceramic for teeth, the glass-ceramic including a silica crystalline phase. The method includes the steps of: performing a primary heat treatment of a glass composition at 400 to 850° C., the glass composition including 60 to 83 wt % of $SiO_2$, 10 to 15 wt % of $Li_2O$, 2 to 6 wt % of $P_2O_5$, which serves as a nucleating agent, 1 to 5 wt % of $Al_2O_3$, which increases the glass transition temperature and softening point and improves the chemical durability of glass, 0.1 to 3 wt % of SrO, which increases the softening point of glass, 0.1 to 2 wt % of ZnO, 1 to 5 wt % of a colorant, and 2.5 to 6 wt % of $Na_2O+K_2O$, which is an alkali metal oxide that increases the coefficient of thermal expansion of glass; and performing a secondary heat treatment at 780 to 880° C. after the primary heat treatment. The primary heat treatment results in the generation of a lithium disilicate crystalline phase and a silica crystalline phase each having a nano size of 5 to 2000 nm, and the secondary heat treatment temperature is used to control light transmittance.

According to the disclosed method, the glass-ceramic obtained through the primary heat treatment has a crystalline size of 5 to 2000 nm, and is a material that is machinable in a lithium disilicate state by precipitating the silica crystalline phase in addition to the lithium disilicate crystalline phase. In addition, the lithium disilicate and silica crystalline phases having a size of 30 to 500 nm are obtained by performing the primary heat treatment in a temperature range of 480 to 800° C., which is preferable in terms of cutting force.

The present inventors have attempted to devise a solution for providing artificial teeth with improved physical properties and aesthetic properties through a simple post-heat treatment while improving workability in a machining process performed by doctors or technicians who are consumers by using a primary heat treatment result as a workpiece and have proposed the present disclosure.

SUMMARY

The present disclosure has been made to address the above problems occurring in the related art, and one of the objectives of the present disclosure is to provide a dental glass-ceramic block capable of controlling a translucency of a dental restoration through an additional heat treatment process and exhibiting excellent machinability during a cutting process such as CAD/CAM machining even in a high-strength workpiece state.

One aspect of the present disclosure provides a dental bulk block for a CAD/CAM machining process, the dental bulk block being a glass-ceramic block having a crystalline phase embedded in an amorphous glass matrix, in which the crystalline phase may include lithium disilicate as a main crystalline phase, no sub-crystalline phase may exist, and the crystalline phase may have a mean grain size of 0.01 to 1.0 μm and a crystallinity degree of 25 to 45%.

In one embodiment of the present disclosure, the dental bulk block may have a biaxial flexure strength of 200 to 380 MPa according to ISO 6872 and a fracture toughness of 1.7 to 2.1 $MPa \cdot m^{1/2}$.

In one embodiment of the present disclosure, the dental bulk block may achieve an average light transmittance of 40 to 50% when heat-treated in a range of 811 to 820° C. for 1 minute to 1 hour.

In one embodiment of the present disclosure, the dental bulk block may achieve an average light transmittance of 30 to 40% when heat-treated in a range of 821 to 850° C. for 1 minute to 1 hour.

In one embodiment of the present disclosure, the dental bulk block may achieve an average light transmittance of 20 to 30% when heat-treated in a range of 851 to 880° C. for 1 minute to 1 hour.

In one embodiment of the present disclosure, the glass matrix may include 69.0 to 75.0 wt % of $SiO_2$, 12.0 to 14.0 wt % of $Li_2O$, 2.5 to 3.5 wt % of $Al_2O_3$, 0.12 to 0.22 wt % of ZnO, 1.1 to 2.7 wt % of $K_2O$, 0.1 to 0.3 wt % of $Na_2O$, and 2.0 to 6.0 wt % of $P_2O_5$.

Another aspect of the present disclosure provides a method of manufacturing a dental bulk block, the method including: preparing a block having a predetermined shape by melting a glass composition including 69.0 to 75.0 wt % of $SiO_2$, 12.0 to 14.0 wt % of $Li_2O$, 2.5 to 3.5 wt % of $Al_2O_3$, 0.12 to 0.22 wt % of ZnO, 1.1 to 2.7 wt % of $K_2O$, 0.1 to 0.3 wt % of $Na_2O$, and 2.0 to 6.0 wt % of $P_2O_5$, forming and cooling the melted glass composition in a mold, and annealing the resultant glass composition at a predetermined rate from 465 to 280° C. for 20 minutes to 2 hours; and heat-treating the block for crystallization from 300° C. to a maximum temperature of 755 to 810° C. for 30 minutes to 6 hours in a furnace.

Another aspect of the present disclosure provides a method of manufacturing a dental restoration, the method including: manufacturing a predetermined dental restoration by machining the dental bulk block according to the aspect of the present disclosure using a machining machine-tool; and heat-treating the predetermined dental restoration to control a translucency value, in which the controlling of the translucency may be at least one step selected from a high translucency control step of performing a heat treatment in a range of 811 to 820° C. for 1 minute to 1 hour, an medium translucency control step of performing a heat treatment in a range of 821 to 850° C. for 1 minute to 1 hour, and a low translucency control step of performing a heat treatment in a range of 851 to 880° C. for 1 minute to 1 hour.

Another embodiment of the present disclosure provides a dental restoration that is obtained by the method according to the aspect of the present disclosure and is a glass-ceramic body having a crystalline phase embedded in an amorphous glass matrix, in which the crystalline phase may include lithium disilicate as a main crystalline phase and at least one selected from cristobalite, tridymite, quartz, spodumene, virgilite, and a mixture thereof as a sub-crystalline phase, and the dental restoration may have a biaxial flexural strength of at least 450 MPa.

In one embodiment of the present disclosure, the dental restoration may be selected from a crown, an inlay, an onlay, and a veneer.

A dental bulk block according to the present disclosure can improve machinability during cutting such as CAD/CAM machining in the state of a high-strength workpiece with high flexural strength, thereby reducing a tool resistance and a wear rate, increasing a tool life span, and reducing edge chippings during the machining process. In addition, a dental restoration having translucency variations can be manufactured through a simple process of machining a block and altering post-heat treatment conditions, and thus can be manufactured with various shades. Therefore, it is possible to contribute to simplifying the product management.

DETAIL DESCRIPTION

The foregoing and further aspects of the present disclosure will become more apparent from exemplary embodiments in conjunction with the accompanying drawings. Hereinafter, exemplary embodiments of the present disclosure will be described in detail such that the disclosure can be better understood and easily embodied by one of ordinary skill in the art to which this disclosure belongs.

One embodiment of the present disclosure provides a dental bulk block for a CAD/CAM machining process, which is a glass-ceramic block having a crystalline phase embedded in an amorphous glass matrix, in which the crystalline phase includes lithium disilicate as a main crystalline phase, no sub-crystalline phase exists, and the crystalline phase has the mean grain size of 0.01 to 1.0 μm and a crystallinity degree of 25 to 45%.

In the previous and following descriptions, the term "main crystalline phase" may be defined as a crystalline phase occupying at least 80% by weight of the entire crystalline phase, and the term "sub-crystalline phase" may be defined as a remaining crystalline phase other than the main crystalline phase in the entire crystalline phase.

The amount of the crystalline phases may be calculated through X-ray diffraction analysis. For example, in a specimen having two polymorphs a and b, the ratio $F_a$ of the crystalline phase a is quantitatively expressed by Equation 1 below.

$$F_a = \frac{1}{1 + K\left(\frac{I_b}{I_a}\right)} \quad \text{[Equation 1]}$$

This value may be obtained by measuring the strength ratio of the two crystalline phases and obtaining the constant K. K is the absolute strength ratio $I_{oa}/I_{ob}$ of two pure polymorphs, which is obtained by measuring a standard material.

In the previous and following descriptions, the term "main crystalline phase" may be defined as being set on the basis of the amount calculated using this calculation method.

In the previous and following descriptions, the bulk block is not limited in a certain shape, and for example, may include a bulk body of various types such as a block type, a disk type, an ingot type, a cylinder type, and the like.

Figure 1:
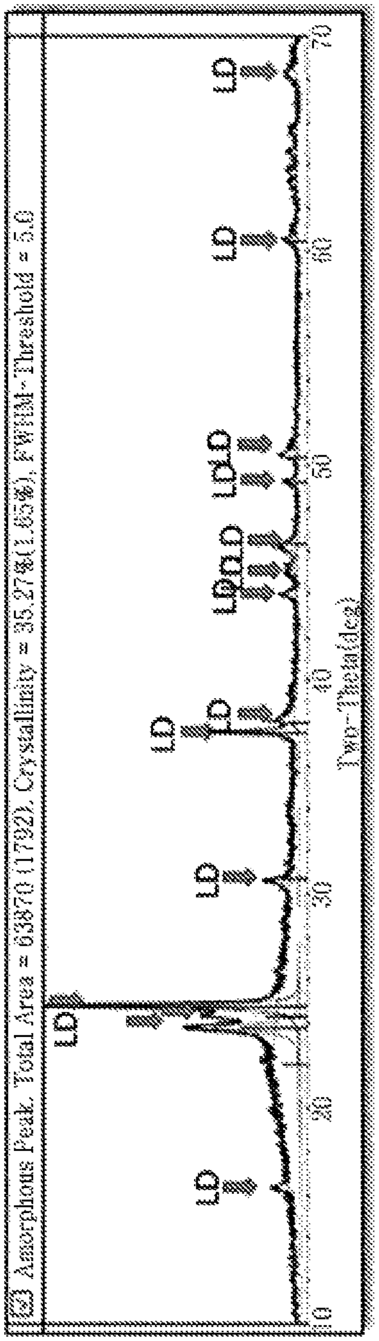
FIG. 1 is an experimental graph of an X-ray diffraction (XRD) analysis result of a dental bulk block manufactured according to the embodiment of the present disclosure.

FIG. 1 illustrates a graph of an X-ray diffraction (XRD) analysis result for the dental bulk block manufactured according to the embodiment of the present disclosure.

In FIG. 1, the bulk dental block manufactured according to the embodiment of the present disclosure includes the lithium disilicate as the main crystalline phase. Only the pure lithium disilicate crystalline phase is precipitated in the glass matrix, with a crystallinity degree of 25 to 45%.

Considering the machinability and transparency control by a post-heat treatment, the dental bulk block according to the present disclosure preferably has a crystallinity degree of 25 to 45%.

In the previous and following descriptions, the term “crystallinity degree” may be defined as the ratio of the crystalline phase to the amorphous glass matrix, which may be obtained through various methods. In one embodiment of the present disclosure, the crystallinity degree is a value automatically calculated by an X-ray diffractometer.

In the previous and following descriptions, XRD analysis will be understood to mean an analysis that is based on a result obtained using an X-ray diffraction analyzer (D/MAX-2500, Rigaku, Japan; Cu Kα (40 kV, 60 mA), scan rate: 6°/min., 2θ: 10 to 70 (degrees), Rigaku, Japan).

The crystalline phase can be formed in the form of microcrystals. These microcrystals have various sizes and size distributions depending on temperatures, thereby causing variations in the mechanical properties and light transmittances.

Figure 2:
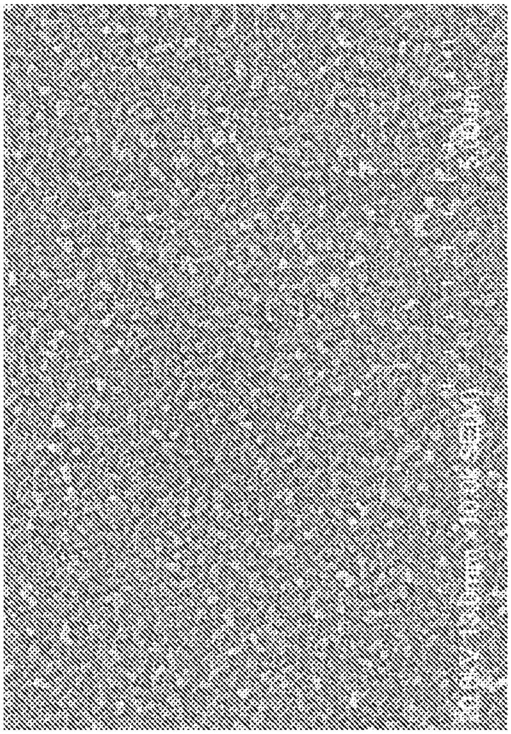
FIG. 2 is an example of a scanning electron microscope (SEM) image illustrating the microstructure and crystalline size of the dental bulk block according to the present disclosure.

In addition, as an example, FIG. 2 illustrates a scanning electron microscope (SEM) image of the dental bulk block according to the present disclosure. The dental bulk block is featured in that the crystalline phase has the mean grain size of 0.01 to 1.0 lam, which is 2.5 to 40 times lower than that of a conventional CAD/CAM workpiece having lithium metasilicate as the main crystalline phase.

The SEM image thus obtained may be used to calculate the mean grain size of crystalline phases. Specifically, the mean grain size may be obtained by a linear intercept method involving: drawing a diagonal line or a straight line randomly on the SEM image; dividing by the length of the line the number of crystalline grains intercepted by the line; and determining the mean grain size depending on magnification.

In the previous and following descriptions, it will be understood that the size of the crystalline phases is calculated by this method.

As the crystalline size and crystallinity degree as described above are satisfied, the dental bulk block for the CAD/CAM machining process has a biaxial flexure strength of 200 to 380 MPa according to ISO 6872, and a fracture toughness of 1.7 to 2.1 MPa·m$^{1/2}$. This satisfies the physical properties improved by 10 to 15% compared to the conventional CAD/CAM workpiece having lithium metasilicate as the main crystalline phase, and thus edge chipping during machining can be advantageously reduced by about 30% or more.

In the case of the dental bulk block obtained according to the present disclosure, it is possible to significantly lower the resistance generated in a machining machine-tool during machining. Specifically, a glass-ceramic block having a crystalline phase embedded in an amorphous glass matrix as illustrated in FIGS. 1 and 2 and having dimensions of 12×14×18 mm was prepared. The glass-ceramic block was rotated at 250 RPM and was cut with an IsoMet™ low speed saw (Buehler, Germany) and a diamond electroplated wheel (2514485H17, Norton, USA), and a cutting time was measured. In addition, for each of conventional lithium disilicate-based blocks (Rosetta SM, HASS Corp®.), a zirconia reinforced lithium disilicate-based block (Celtra Duo, DentsplySirona), and an LAS reinforced lithium disilicate-based block (Nice, Straumann), a cutting time was measured in the same manner as described above.

From each cutting time value thus obtained, cutting resistances (%) was calculated. Specifically, the cutting time obtained for the conventional lithium disilicate-based block was assumed to be 100%, and a relative percentage of the cutting time for each of the other blocks was calculated as a cutting resistance value.

Figure 3:
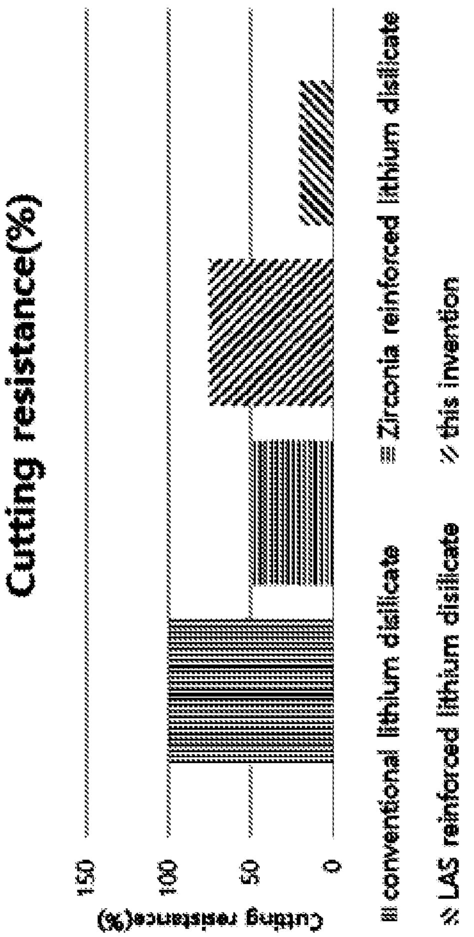
FIG. 3 is an experimental comparative graph of cutting resistance for the dental bulk block according to the present disclosure.

The experimental results are illustrated in FIG. 3. From the results of FIG. 3, it can be seen that the conventional lithium disilicate-based block had the highest cutting resistance, followed by the LAS reinforced lithium disilicate-based block and the zirconia reinforced lithium disilicate-based block, and the block according to the present disclosure exhibited the lowest cutting resistance. From these results, it can be found that the lithium disilicate-based glass-ceramic block according to the present disclosure is the most machinable.

As described above, the dental bulk block is the glass-ceramic block having the crystalline phase embedded in the amorphous glass matrix. The crystalline phase includes lithium disilicate as the main crystalline phase, no sub-crystalline phase exists, and the crystalline phase has the mean grain size of 0.01 to 1.0 μm and a crystallinity degree of 25 to 45%. The crystalline phase has various sizes and size distributions depending on temperature. Therefore, the dental bulk block exhibits variations in mechanical properties and light transmittance.

For example, the dental bulk block for the CAD/CAM machining process according to the embodiment of the present disclosure may achieve an average light transmittance of 40 to 50% when heat-treated in the range of 811 to 820° C. for 1 minute to 1 hour. The bulk block having such a high translucency may be useful for applications such as inlays or onlays, but is not limited thereto.

A dental bulk block for a CAD/CAM machining process according to another embodiment of the present disclosure may achieve an average light transmittance of 30 to 40% when heat-treated in the range of 821 to 850° C. for 1 minute to 1 hour. The bulk block having such a medium translucency may be useful for coloring purposes, but is not limited thereto.

A dental bulk block for a CAD/CAM machining process according to another embodiment of the present disclosure may achieve an average light transmittance of 20 to 30% when heat-treated in the range of 851 to 880° C. for 1 minute to 1 hour. The bulk block having such low translucency may be useful for applications such as posterior crowns, but is not limited thereto.

In the previous and following descriptions, the light transmittance is measured using a UV-visible spectrometer (UV-2401PC, Shimadzu, Japan).

In order to measure the light transmittance of the dental bulk block according to the present disclosure, the surface of each specimen was wiped clean with ethanol, and then the light transmittance was measured using a UV-visible spectrometer (UV-2401PC, Shimadzu, Japan). Here, the measurement was performed under a condition in which the wavelength range was 300 to 800 nm, and the slit width was 2.0 nm. The average light transmittance may be defined as an average value of light transmittance in the entire wavelength range.

Figure 4:
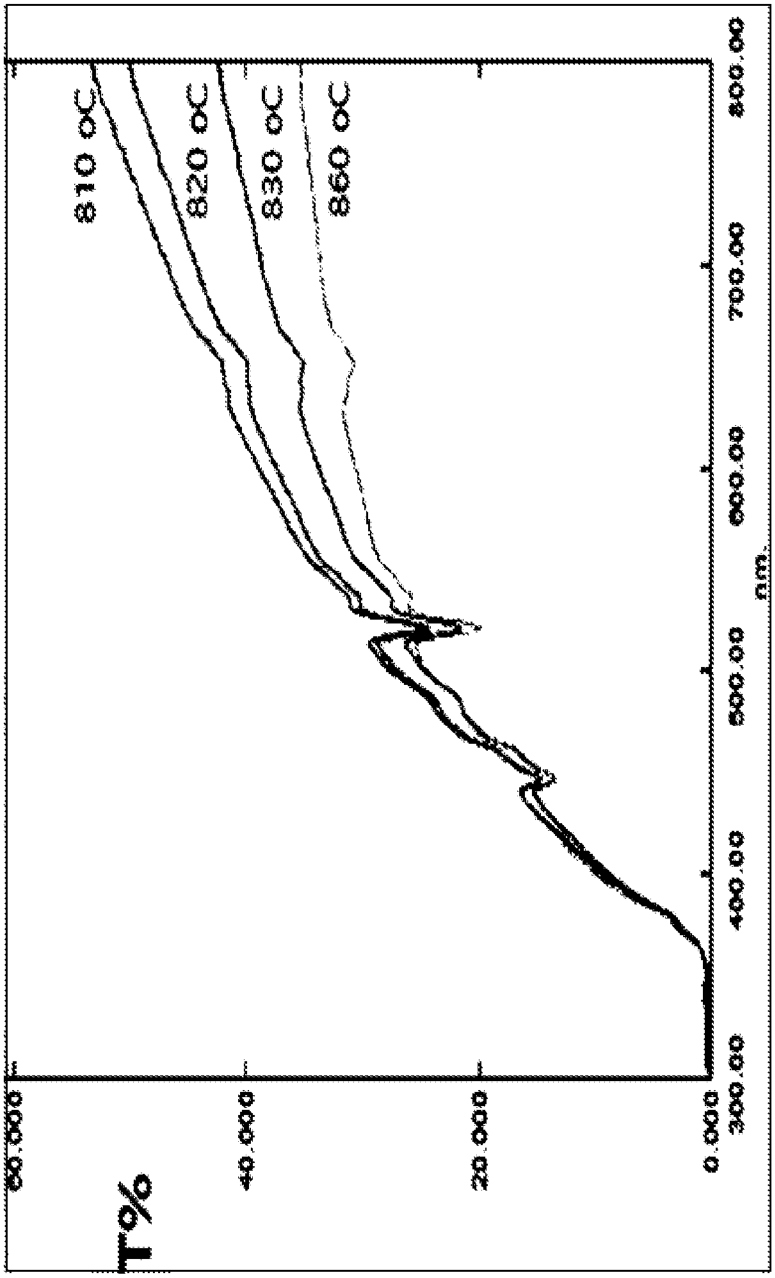
FIG. 4 is an experimental graph of changes in the transmittance according to post-heat treatment temperatures of the dental bulk block according to the embodiment of the present disclosure.

FIG. 4 is an experimental graph of changes in the transmittance values (in the vertical axis) according to post-heat treatment temperatures of the dental bulk block according to the present disclosure, in which the transmittance is measured according to the method described above.

Meanwhile, in the case of the dental bulk block for the CAD/CAM machining process according to the present disclosure, the glass matrix may include 69.0 to 75.0 wt % of $SiO_2$, 12.0 to 14.0 wt % of $Li_2O$, 2.5 to 3.5 wt % of $Al_2O_3$, 0.12 to 0.22 wt % of ZnO, 1.1 to 2.7 wt % of $K_2O$, 0.1 to 0.3 wt % of $Na_2O$, and 2.0 to 6.0 wt % of $P_2O_5$.

A glass composition constituting the glass matrix is subjected to a crystal nucleation and crystal growth heat treatment for crystallization to precipitate a crystalline phase in an amorphous glass matrix. The temperature at which crystal nucleation and crystal growth occur in the glass temperature is in the range of 500 to 880° C. That is, a crystal nucleus starts to form from a minimum of 500° C. and a crystal grows while the temperature is raised. The crystal grows up to a maximum of 880° C. at which the dental bulk block exhibits the lowest light transmittance for use as the material for artificial teeth. In other words, the translucency is gradually lowered from the temperature at which the crystal starts to grow to a maximum of 850° C. The present disclosure is based on this phenomenon. That is, a single bulk block may be manufactured by performing crystal growth to the extent that high strength and sufficient machinability are satisfied. The single bulk block thus obtained may be subjected to a machining process and then be controlled in a translucency thereof by altering the heat treatment conditions depending on the required fitting position or the unique color of the patient's teeth. Therefore, if the single bulk block can exhibit variations in its translucency, it is possible to contribute to simplifying the product management.

As to natural teeth, the translucency locally varies not only within a single natural tooth but also among multiple natural teeth. In addition, the required translucency may be different for each patient and each fitting position. Therefore, if such translucency variations depending on the heat treatment temperature can be realized using a single bulk block in various ways according to purposes, it is possible to provide artificial teeth that satisfy various aesthetic requirements by using a small workpiece.

Figure 5:
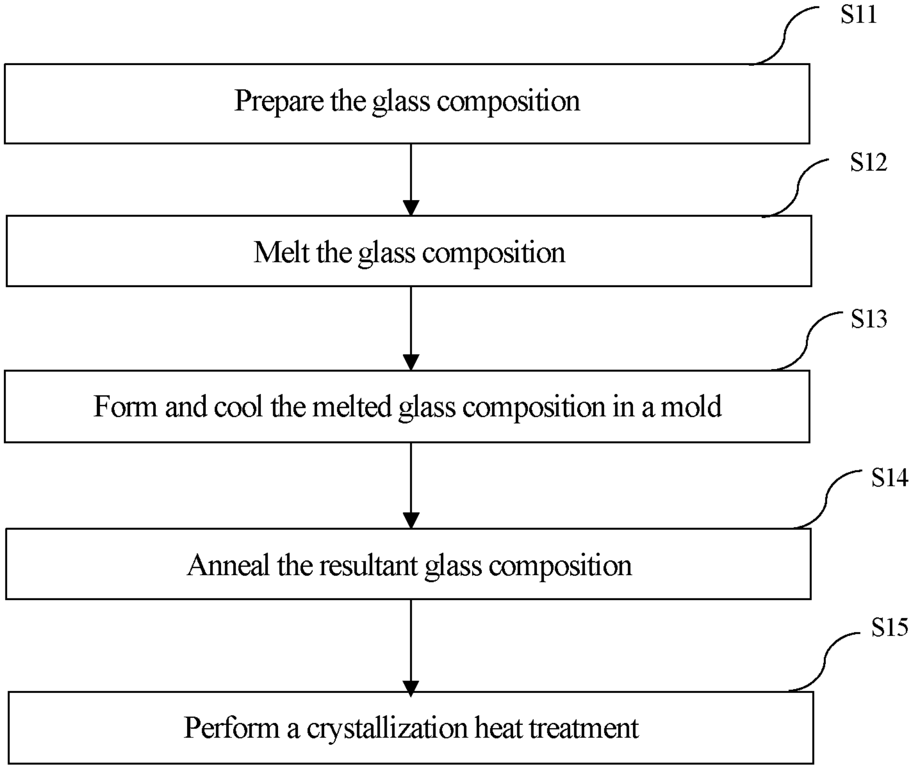
FIG. 5 illustrates an example method of manufacturing a dental bulk block according to one embodiment of the present disclosure.

FIG. 5 illustrates an example method of manufacturing a dental bulk block according to one embodiment of the present disclosure. The method includes the steps of: manufacturing a block having a predetermined shape by preparing S11 a glass composition including 69.0 to 75.0 wt % of $SiO_2$, 12.0 to 14.0 wt % of $Li_2O$, 2.5 to 3.5 wt % of $Al_2O_3$, 0.12 to 0.22 wt % of ZnO, 1.1 to 2.7 wt % of $K_2O$, 0.1 to 0.3 wt % of $Na_2O$, and 2.0 to 6.0 wt % of $P_2O_5$, melting S12 the glass composition, forming and cooling S13 the melted glass composition in a mold, and annealing S14 the resultant glass composition at a predetermined rate from 465 to 280° C. for 20 minutes to 2 hours; and heat-treating S15 the block for crystallization from 300° C. to a maximum temperature of 755 to 810° C. for 30 minutes to 6 hours in a furnace.

As a specific embodiment of the present disclosure, first, a glass composition is prepared in step S11 by weighing and mixing 69.0 to 75.0 wt % of $SiO_2$, 12.0 to 14.0 wt % of $Li_2O$, 2.5 to 3.5 wt % of $Al_2O_3$, 0.12 to 0.22 wt % of ZnO, 1.1 to 2.7 wt % of $K_2O$, 0.1 to 0.3 wt % of $Na_2O$, and 2.0 to 6.0 wt % of $P_2O_5$.

As a component of the glass composition, $Li_2CO_3$ may be added instead of $Li_2O$. In this case, carbon dioxide ($CO_2$), which is a carbon (C) component of $Li_2CO_3$, is exhausted in a gas form during glass melting. In addition, as alkali oxides, $K_2CO_3$ and $Na_2CO_3$ may be added instead of $K_2O$ and $Na_2O$, respectively. In this case, carbon dioxide ($CO_2$), which is a carbon (C) component of $K_2CO_3$ and $Na_2CO_3$, is exhausted in a gas form during glass melting.

The mixing is performed using a dry mixing process. Specifically, a ball-milling process may be used as the dry mixing process. Specifically, the ball-milling process involves charging a starting raw material into a ball-milling machine, and then rotating the ball-milling machine at a predetermined speed to mechanically pulverize and uniformly mix the starting raw material. Balls for use in the ball-milling machine may be made of a ceramic material such as zirconia or alumina. The balls may have the same sizes, or at least two different sizes. The sizes of the balls, milling time, rotation speed of the ball-milling machine, etc. are controlled in consideration of a desired grain size. For example, in consideration of the desired grain size, the size of each of the balls may be set to be in the range of about 1 to 30 mm, and the rotation speed of the ball-milling machine may be set to be in the range of about 50 to 500 RPM. The ball milling is preferably performed for 1 to 48 hours in consideration of the desired grain size. During the ball milling, the starting raw material is pulverized into fine grains with a uniform grain size, and at the same time is uniformly mixed.

The mixed starting raw material is placed in a melting furnace in step S12, and then melted by heating the melting furnace containing the starting raw material therein. Here, the term "melting" means that the starting raw material is converted into a viscous liquid state, not a solid state. The melting furnace is preferably made of a material having a high melting point and a high strength and also having a low contact angle for suppressing the phenomenon in which a molten material is adhered thereto. To this end, preferably, the melting furnace is made of a material such as platinum (Pt), diamond-like carbon (DLC), or chamotte, or is coated with a material such as platinum (Pt) or diamond-like carbon (DLC).

The melting is preferably performed at 1,400 to 2,000° C. under normal pressure for 1 to 12 hours. When the melting temperature is less than 1,400° C., the starting raw material may fail to melt completely. On the other hand, when the melting temperature exceeds 2,000° C., excessive energy consumption is necessary, which is not economical. Therefore, it is preferable that the melting is performed at a temperature within the above range. In addition, when the melting time is very short, the starting raw material may fail to sufficiently melt. On the other hand, when the melting time is very long, excessive energy consumption is necessary, which is not economical. The temperature increase rate of the melting furnace is preferably about 5 to 50° C./min. When the temperature increase rate of the melting furnace is very slow, a long period of time may be taken, which may reduce productivity. On the other hand, when the temperature increase rate thereof is very fast, a rapid temperature increase may cause an increase in a volatilization amount of the starting raw material, and the physical properties of glass-ceramic may be poor. Therefore, it is preferable that the temperature of the melting furnace is increased at a rate within the above range. The melting is preferably performed in an oxidation atmosphere such as oxygen ($O_2$) and air.

In step S13, the molten material is poured into a predetermined mold in order to obtain a dental glass-ceramic having a desired shape and size. The mold is preferably made of a material having a high melting point and a high strength and also having a low contact angle for suppressing the phenomenon in which the glass molten material adheres thereto. To this end, the mold is made of a material such as graphite and carbon. In order to prevent thermal shock, the molten material is preferably preheated to 200 to 300° C. and then be poured into the mold.

After the molten material contained in the mold is formed and cooled in step S13, the resultant glass composition material is preferably subjected to annealing at a predetermined rate from 465 to 280° C. for 20 minutes to 2 hours in step S14. Here, the predetermined rate is preferably 1.5 to 10° C./min.

With the annealing, it is possible to reduce stress deviation in the resultant glass composition material, preferably so that no stress exists, thereby having a desirable effect on controlling the size of the crystalline phase and improving the homogeneity of crystal distribution in a subsequent crystallization process.

The resultant glass composition material subjected to the annealing is transferred to a firing furnace for a crystallization heat treatment process in step S15 to perform a crystal nucleation and growth process, thereby manufacturing a desired glass-ceramic.

Here, the crystallization heat treatment is performed in the furnace for 30 minutes to 6 hours from 300° C. to a maximum temperature of 755 to 810° C. As a result, a bulk block including only pure lithium disilicate as a crystalline phase having a size of 0.01 to 1.0 μm is obtained.

The dental bulk block obtained through the above-described method may exhibit characteristics in which the translucency of the material varies depending on the heat treatment temperature range.

In the case of bulk-type blocks, they are used as workpieces for machining such as CAD/CAM machining. In general, conventional glass-ceramics have a difficulty in controlling a translucency due to coarse crystalline phases, and are difficult to machine due to high strength. On the contrary, the block according to the present disclosure includes microcrystals, and these microcrystals have various sizes and size distributions depending on temperature. Therefore, the block exhibits regional variations in the physical properties and translucency. On the basis of this fact, a block may be manufactured from a single glass composition. The block thus obtained may be subjected to machining and then controlled in a translucency value depending on the heat treatment condition.

Figure 6:
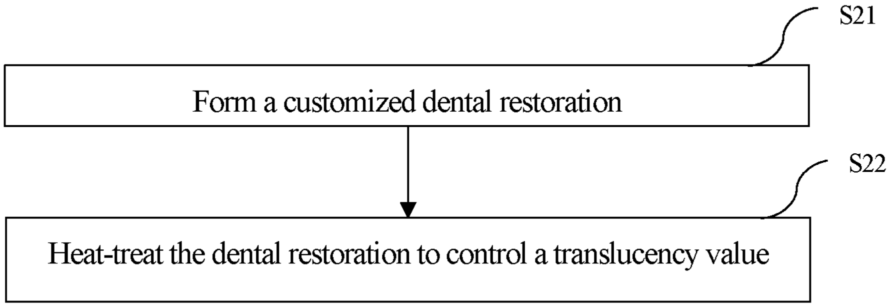
FIG. 6 illustrates an example method of manufacturing a dental restoration according to one embodiment of the present disclosure.

FIG. 6 illustrates an example method of manufacturing a dental restoration according to one embodiment of the present disclosure. The method includes the steps of: forming S21 a customized dental restoration by machining the dental bulk block by the CAD/CAM machining process according to the embodiments by using a machining machine-tool; and heat-treating S22 the formed dental restoration to control a translucency of the dental restoration machined from the dental bulk block. The controlling of the translucency is at least one step selected from a high translucency control step of performing heat treatment in the range of 811 to 820° C. for 1 minute to 1 hour, a medium translucency control step of performing heat treatment in the range of 821 to 850° C. for 1 minute to 1 hour, and a low translucency control step of performing heat treatment in the range of 851 to 880° C. for 1 minute to 1 hour.

The dental restoration according to the present disclosure exhibits the characteristics as illustrated in FIG. 4. Therefore, a dental restoration with a low translucency to a high translucency can be obtained from a single block, and thus can be realized with more than 80 various shades.

The dental restoration thus obtained is a glass-ceramic body having a crystalline phase embedded in an amorphous glass matrix. The crystalline phase may include lithium disilicate as a main crystalline phase and at least one selected from cristobalite, tridymite, quartz, spodumene, virgilite, and a mixture thereof as a sub-crystalline phase. The dental restoration may have a biaxial flexural strength of at least 450 MPa. The translucency of the dental restoration may be variously controlled depending on the fitting position or the patient.

Therefore, it is possible to provide a dental restoration with improved aesthetic properties by realizing translucency variations while being able to tolerate the occlusal force of the posterior region.

In the previous and following descriptions, the dental restoration may be selected from a crown, an inlay, an onlay, and a veneer, but is not limited thereto.

Although the exemplary embodiments of the present disclosure have been disclosed for illustrative purposes, those skilled in the art will appreciate that various modifications, additions, and substitutions are possible, without departing from the scope and spirit of the disclosure as disclosed in the accompanying claims.

The present disclosure relates to a dental bulk block for a CAD/CAM machining process and a manufacturing method thereof, the dental bulk block being capable of use as a high-strength workpiece while enabling the dental bulk to have desired translucency variations.

The dental bulk block according to the present disclosure can improve machinability during cutting such as CAD/CAM machining in the state of a high-strength workpiece with high flexural strength, thereby reducing a tool resistance and wear rate, increasing a tool life span, and reducing edge chipping during machining. In addition, a dental restoration having translucency variations can be manufactured through a simple process of machining a block and altering post-heat treatment conditions, and thus can be realized with various shades. Therefore, it is possible to contribute to simplifying the product management.

The invention claimed is:

1. A dental bulk block for a CAD/CAM machining process, the dental bulk block being a glass-ceramic block having a crystalline phase embedded in an amorphous glass matrix, wherein the crystalline phase comprises lithium disilicate as a main crystalline phase, no sub-crystalline phase exists, the crystalline phase has a mean grain size of 0.01 to 1.0 um, the dental bulk block has a crystallinity degree of 25 to 45%, and the glass matrix comprises 69.0 to 75.0 wt % of $SiO_2$, 12.0 to 14.0 wt % of $Li_2O$, 2.5 to 3.5 wt % of $Al_2O_3$, 0.12 to 0.22 wt % of ZnO, 1.1 to 2.7 wt % of $K_2O$, 0.1 to 0.3 wt % of $Na_2O$, and 2.0 to 6.0 wt % of $P_2O_5$.

2. The dental bulk block of claim 1, wherein the dental bulk block has a biaxial flexure strength of 200 to 380 MPa according to ISO 6872® and a fracture toughness of 1.7 to 2.1 $MPa{\cdot}m^{1/2}$.

3. The dental bulk block of claim 1, wherein the dental bulk block achieves an average light transmittance of 40 to 50% when heat-treated in a range of 811 to 820° C. for 1 minute to 1 hour.

4. The dental bulk block of claim 1, wherein the dental bulk block achieves an average light transmittance of 30 to 40% when heat-treated in a range of 821 to 850° C. for 1 minute to 1 hour.

5. The dental bulk block of claim 1, wherein the dental bulk block achieves an average light transmittance of 20 to 30% when heat-treated in a range of 851 to 880° C. for 1 minute to 1 hour.

6. A method of manufacturing a dental restoration, the method comprising:

manufacturing a predetermined dental restoration by machining the dental bulk block of claim 1 using a machining machine-tool; and heat-treating the predetermined dental restoration to control translucency, wherein the controlling of the translucency is at least one step selected from a high translucency control step of performing heat treatment in a range of 811 to 820° C. for 1 minute to 1 hour, an medium translucency control step of performing heat treatment in a range of 821 to 850° C. for 1 minute to 1 hour, and a low translucency control step of performing heat treatment in a range of 851 to 880° C. for 1 minute to 1 hour.

7. A dental restoration that is obtained by the method of claim 6 and is a glass-ceramic body having a crystalline phase embedded in an amorphous glass matrix, wherein the crystalline phase of the dental restoration comprises lithium disilicate as a main crystalline phase and at least one selected from cristobalite, tridymite, quartz, spodumene, virgilite, and a mixture thereof as a sub-crystalline phase, and the dental restoration has a biaxial flexural strength of at least 450 MPa.

8. The dental restoration of claim 7, wherein the dental restoration is selected from a crown, an inlay, an onlay, and a veneer.

* * * * *